Oct. 22, 1935.　　　E. W. HEINTGES　　　2,018,360
CONVEYER APPARATUS
Filed June 1, 1934
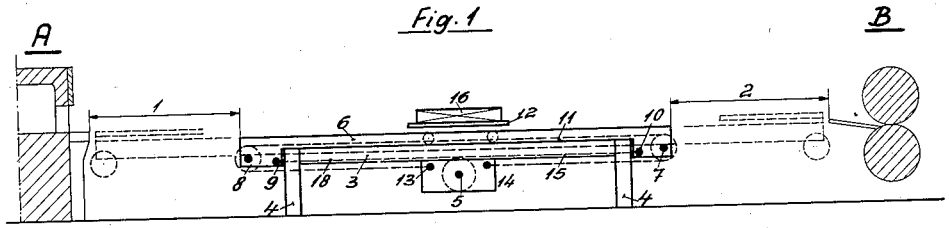
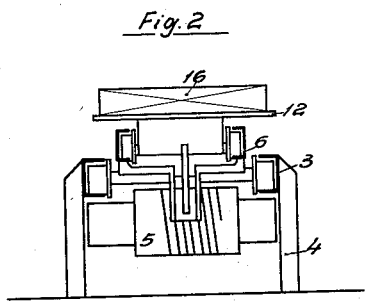
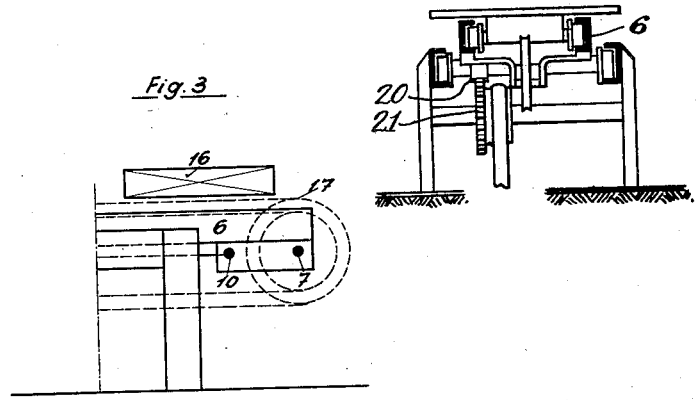
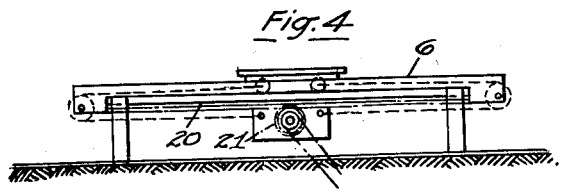
Inventor
E. W. Heintges.
by
W. E. Evans,
Attorney.

Patented Oct. 22, 1935

2,018,360

UNITED STATES PATENT OFFICE 2,018,360

CONVEYER APPARATUS

Ernst Wilhelm Heintges, Hennigsdorf, near Berlin, Germany

Application June 1, 1934, Serial No. 728,517
In Germany August 28, 1933

8 Claims. (Cl. 198—1)

The invention relates to conveyer apparatus adapted to operate between two places of work, intended more particularly for carrying rolled material to and fro between a rolling mill and a furnace.

The invention is characterized by a carrier for a platform, truck or equivalent work support which carrier is provided to move in a stationary horizontal guide in such manner that it may project over the ends of the guide alternatively, the platform or the like being capable of travelling along the said carrier on which it is moved by a driving connection between it and the carrier so that it has a movement on the carrier simultaneously with that of the carrier and in the same direction.

The construction of conveyer apparatus according to the invention has the great advantage that while inoperative, it leaves the work places unobstructed so that work which is to be carried out there is not interfered with by the conveyer.

Conveyers are known which are employed, for example, in conveying rolled material from one pair of rollers to another pair some distance away and which enables the work place or the space in front of the working rollers to be kept unobstructed while the conveyer is inoperative. According to the known construction this is effected by providing a conveyer belt running over pulleys and capable of being folded in the vertical plane. Such apparatus is intricate and involved. Furthermore carriages are known for conveying rolled material from one work place to another, the material being conveyed to the discharge position by means of a group of rollers provided to travel on the carriages.

According to the present invention an extremely simple and effective conveyer device is provided operating between two work places, and in which the horizontal guide for the carrier of the platform, truck or the equivalent hereinbefore referred to is capable of being adjusted in height so as to be adapted to different working conditions.

The apparatus according to the invention is diagrammatically illustrated, by way of example, in the accompanying drawing in which Figure 1 is a front elevation, Figure 2 is a sectional end elevation of a construction of conveyer apparatus according to the invention, and Figure 3 is a detail view in elevation of part of a modified construction of conveyer apparatus shown on an enlarged scale.

Figures 4 and 5 are respectively a front elevation and a sectional end elevation of a modified construction of the apparatus.

Referring to Figures 1 and 2, of the accompanying drawing the conveyer is erected between the work places A and B and is of such dimensions that a certain amount of space—1 and 2— is left free to permit the operatives to work and move about.

A horizontal guide 3 is provided with vertical supports 4 or their equivalent which may be of any desired height so that the guide can be adjusted to the various working heights.

In the guide 3 travels a carrier 6 having rollers 7 and 8 mounted at the two ends. A flexible member 11 passes over the rollers, and is secured to the guide 3 at 13 and 14. At a position midway between the rollers 7 and 8 a platform 12 adapted to run upon the carrier 6 is connected to the part of the flexible member 11 which is positioned above the rollers 7 and 8; the platform 12 is thus guided in the carrier 6, advantageously on wheels and is adapted to carry the load 16. Furthermore, flexible drawing members 15 and 18 are secured to the carrier 6 at the one end at 10 and at the other end at 9, the other ends of the members 15 and 18 being wound around the pulley 5 adapted to be rotated by an electric motor.

The carrier 6 can travel outwardly from one or other end of the guide 3 from the middle position, the platform 12 moving on the carrier in the same direction. The flexible member 11 may be provided, as shown in Figure 3, in the form of a chain 17, the chain 17 directly carrying the load 16 by that portion which projects above the upper edge of the carrier 6. Instead of the drawing members 15, 18, a rack 20 may be provided between the fixed positions 9, 10, on the carrier and teeth 21 on the periphery of the pulley 5, which then becomes a belt pulley, engaging in the rack, as illustrated in Figs. 4 and 5.

The conveyer apparatus operates as follows:

The pulley 5 is rotated in one or other direction as required. This movement causes the carrier 6 to be drawn forward by the drawing member 15 or 18. Simultaneously the platform 12 is moved in the same direction by reason of the anchoring of the flexible member 11 to the guide 3 at 13 or 14. The carrier 6 thus moves from the middle position into one or other of the end positions and the platform 12 moves to one or other end of the carrier 6. The load 16 is thus conveyed on the platform 12. The load may be placed on the conveyer or removed therefrom at the work places A, B or anywhere between those two places.

I claim:

1. A conveyer apparatus for operating between two work places, more particularly intended for conveying rolled material to and fro between a rolling mill and a furnace, comprising a stationary guide adapted for support at any determined elevation from a supporting surface, a carrier mounted for movement in opposite directions upon the guide with a travel such that it may project from either end of the guide, a work support mounted for movement from end to end of the carrier, means for traversing the carrier upon the guide and means for imparting movement to the work support consequent upon the movement of the carrier.

2. A conveyer apparatus according to claim 1, wherein the means for traversing the carrier upon the guide comprise a rotatable driving element supported in fixed relation to the guide and a driven element or elements connected to the carrier and engaged by the rotatable driving element.

3. A conveyer apparatus according to claim 1, having a rotatable driving pulley supported in fixed relation to the guide and a flexible element or elements connected to the respective ends of the carrier and wrapped around the rotatable driving pulley.

4. A conveyer apparatus according to claim 1, having a rotatable driving toothed element supported in fixed relation to the guide and a toothed rack extending along the length of the carrier for engagement with the driving toothed element.

5. A conveyer apparatus according to claim 1, having a rotatable driving pulley supported in fixed relation to the guide and provided with a crown of teeth and a longitudinal toothed rack mounted upon the carrier and engaged by the teeth of the pulley.

6. A conveyer apparatus according to claim 1, having the carrier provided at each end with a rotatable element and with a flexible element extending along the upper part of the carrier to pass over the said rotatable elements and to be anchored to the guide.

7. A conveyer apparatus according to claim 1, having the carrier provided at each end with rotatable elements and with a flexible element extending along the upper part of the carrier and adapted to serve as a work support, the flexible element being carried over the rotatable elements and anchored at each end to the guide.

8. A conveyer apparatus according to claim 1, having a platform mounted to travel from end to end of the carrier, a rotatable element at each end of the carrier, and a flexible element extending along the upper part of the carrier and coupled to the said platform and passing over the said rotatable elements to be anchored at the ends to the guide.

ERNST WILHELM HEINTGES.